March 19, 1968   C. C. CRAIG   3,373,673
FILM HOLDER
Filed June 7, 1965   3 Sheets-Sheet 1
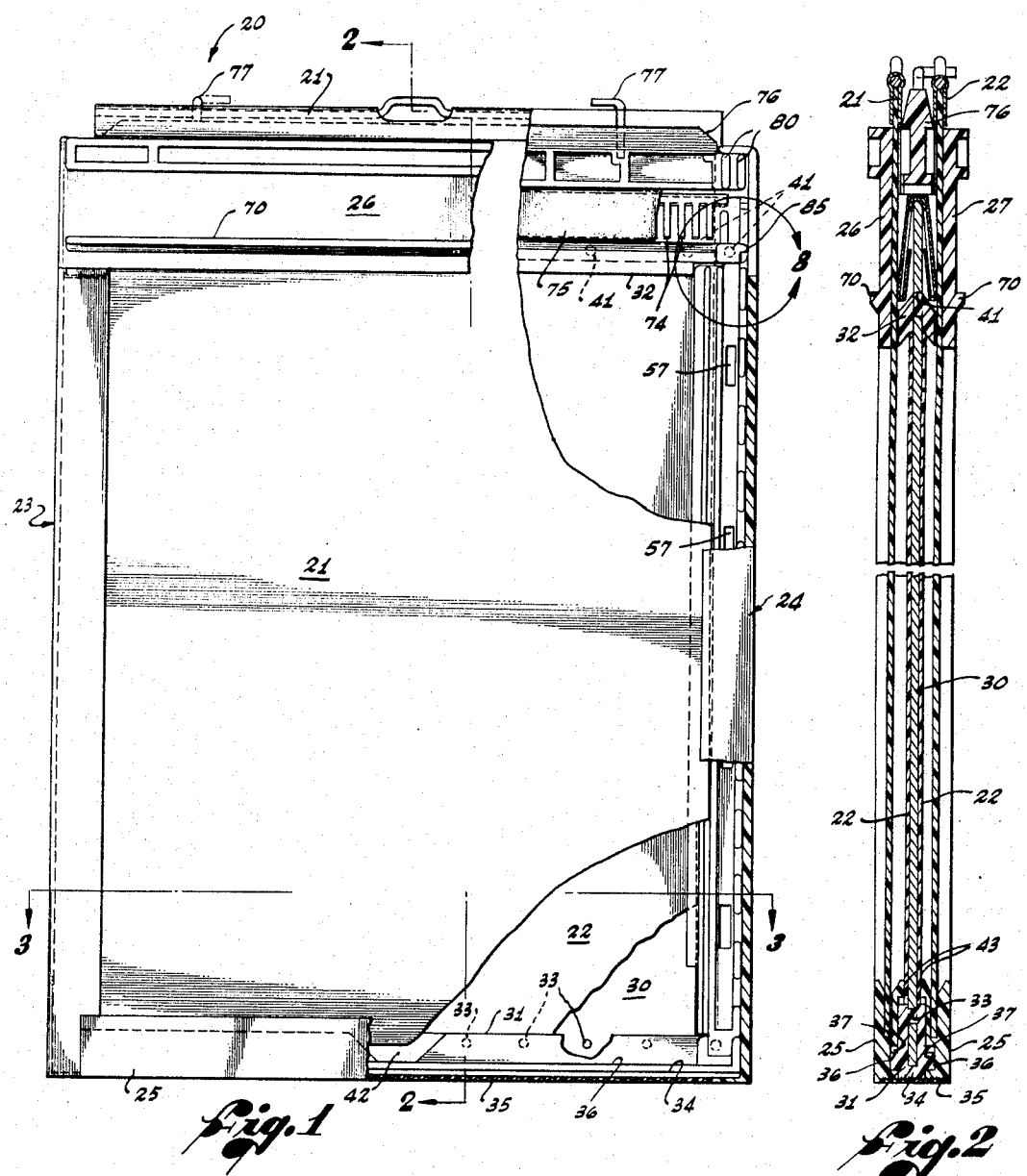
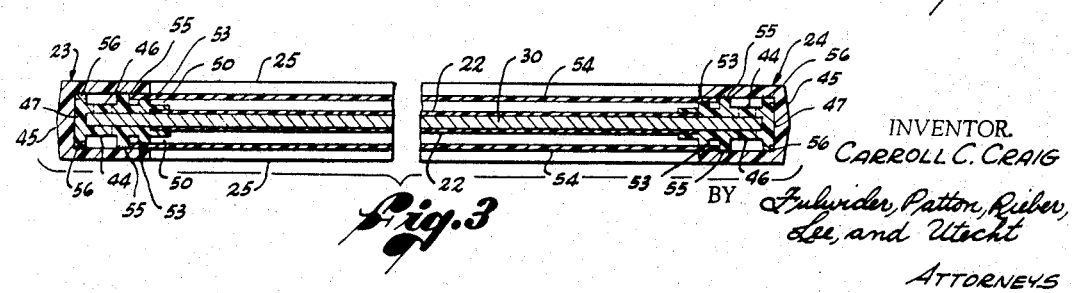
INVENTOR.
CARROLL C. CRAIG
BY Fulwider, Patton, Rieber,
Lee, and Utecht
ATTORNEYS March 19, 1968

C. C. CRAIG 3,373,673

FILM HOLDER

Filed June 7, 1965

INVENTOR.
CARROLL C. CRAIG
BY Bulwinkle, Patton,
Rieber, Lee, and Utecht
ATTORNEYS

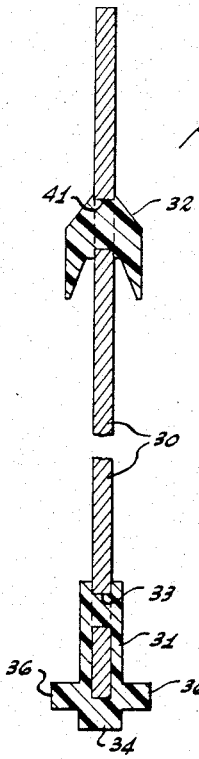
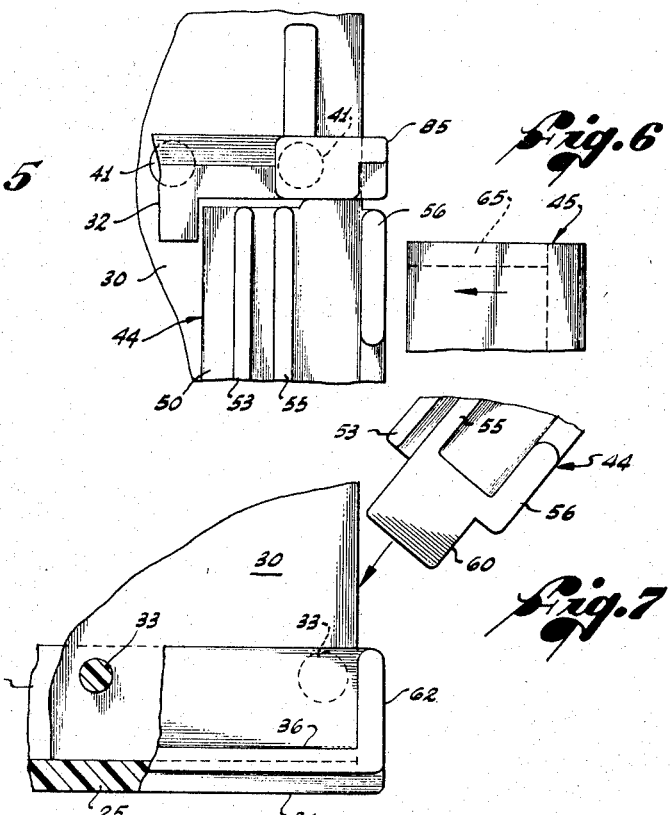
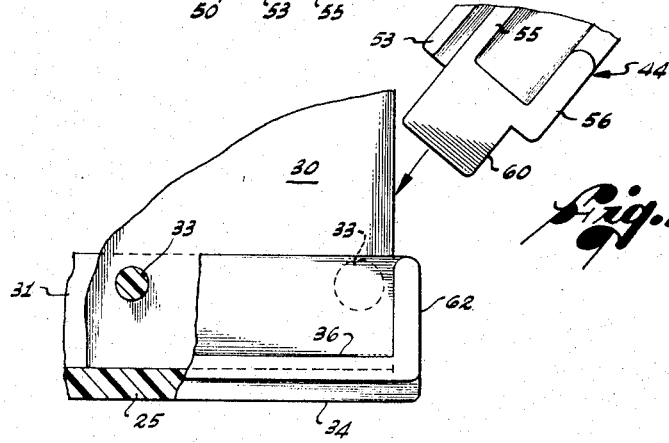
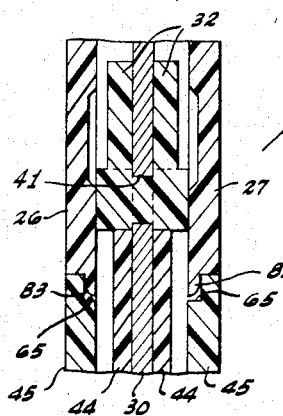
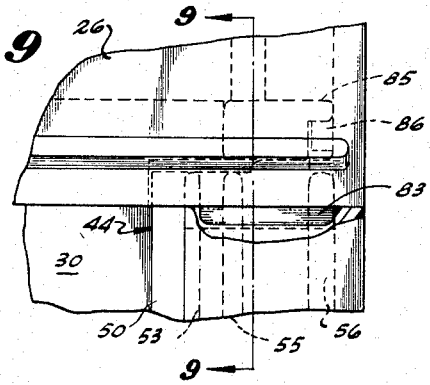

United States Patent Office 3,373,673
Patented Mar. 19, 1968

3,373,673
FILM HOLDER
Carroll C. Craig, 635 Muirfield Road,
Los Angeles, Calif. 90005
Filed June 7, 1965, Ser. No. 461,618
6 Claims. (Cl. 95—66)

ABSTRACT OF THE DISCLOSURE

A film holder for cut film, formed with a metal septum to which are attached the plastic elements which, with the septum, make up the film holder. The plastic elements are interlocked with each other so that external blows, etc., will not cause them to separate and admit light to the light-sensitive material.

This invention relates generally to film holders and more particularly to such a holder adapted to receive a sheet of cut film for exposure in a camera, as opposed to a holder intended to receive a roll of film. Customarily, cut film holders hold two sheets of film, one on each side of the holder.

In the practice of photography, a photosensitive emulsion is formed upon a base material which originally was glass, and more recently has been a synthetic plastic such as cellulose nitrate or cellulose acetate. The combination of the photosensitive material and the base is commonly known as film, and presently film is customarily used in either in the form of long strips or webs on which a series of exposures are made, this being known generally as roll film, or the film may be in the form of individual sheets, in which case the film is known as cut film.

As the sensitivity or speed of the film has increased, it has become increasingly important to provide a film holder that is light tight at all times. Furthermore, with the increasing mobility of photographers it has become increasingly important to provide lightweight film holders of rugged construction requiring a minimum of space.

Originally, the plate holders were made principally of wood, and this required a wood having good dimensional stability as well as a number of other properties, and cherry wood was often selected. More recently the more rigorous requirements imposed by the newer emulsions have required products having even greater stability and precision, and it has become customary to form film holders, the successor to plate holders, of metal and a suitable plastic. This has required the complete redesign of the film holder, and as experience has been gained and new problems have arisen, improved designs have resulted. By way of example, earlier designs of the present inventor are shown in his Patents No. 2,946,271, issued July 26, 1960, and No. 3,091,168, issued May 28, 1963.

It is a major object of the present invention to provide an improved film holder for modern, high speed films.

Another object of the invention is to provide such a film holder that makes use of precision formed plastic elements combined with metal members to form a rugged and dependable film holder.

It is a further object of the invention to provide such a film holder in which the plastic and metal members are combined in such a manner that the two cannot be separated from each other without obviously and completely destroying the holder.

Still another object of the invention is to provide such a holder in which the plastic members interlock with one another to provide a dependable light tight holder.

It is a still further object of the invention to provide such a holder having these and other advantages that can be manufactured at a lower cost and at a higher rate of speed without sacrificing the desirable characteristics.

These and other objects and advantages of the invention will become apparent from the following description of the preferred form thereof, and from the drawings illustrating that form in which:

FIGURE 1 is a front elevational view, partly broken away, showing the construction of the improved plate holder;

FIGURE 2 is an enlarged longitudinal sectional view taken on the line 2—2 of FIGURE 1, showing certain details of construction;

FIGURE 3 is an enlarged cross sectional view of the film holder taken on the line 3—3 of FIGURE 1 and showing other details of construction;

FIGURE 5 is a cross sectional view of the septum or reinforcing plate taken on the line 5—5 of FIGURE 4;

FIGURE 6 is an enlarged fragmentary front elevational view of the elements shown in the circled area 6 of FIGURE 4, illustrating the method of assembly;

FIGURE 7 is an enlarged fragmentary front elevational view of the elements shown in the circled area 7 in FIGURE 4, illustrating the assembly of the elements at the lower corner of the film holder;

FIGURE 8 is a view in the same area as FIGURE 6 but with more elements shown assembled, and with the outer side member broken away to show the tongue on the lock rib plate; and FIGURE 9 is a cross sectional view taken on the line 9—9 of FIGURE 8 and showing the interconnection of some of the various elements.

Figure 4:
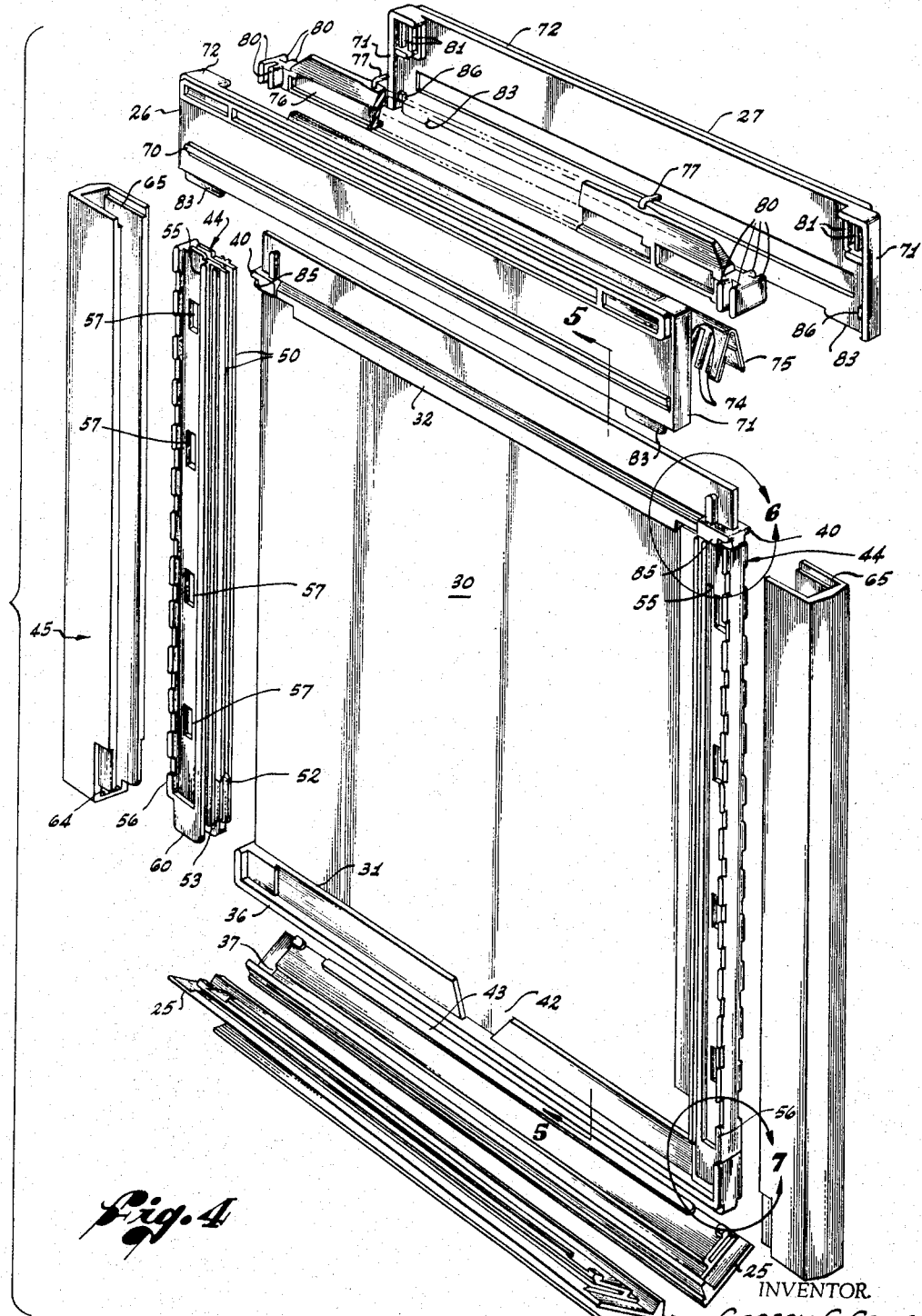
FIGURE 4 is a perspective exploded view showing the various elements that go to make up the film holder in their approximate relative position when assembled.

Referring now to the drawings and particularly to FIGURE 1 thereof, the numeral 20 indicates generally a film holder having a pair of dark slides 21 each of which may be removed from the film holder to uncover a sheet 22 of cut photographic film held within the holder.

To aid in the description of the holder, the various elements will be described in their relative position as they appear in FIGURE 1. Thus, the holder 20 is considered as being vertical, with its shorter edges horizontal, and its longer edges vertical. The dark slides 21 are removable from the upper shorter edge, referred to as the top or upper edge of the holder, and the opposite edge is referred to as the bottom or lower edge. The longer edges are considered as the right and left sides or edges, and the dark slide closest the observer is the front or forward slide while the dark slide on the other side of the holder is the rear slide.

The film holder 20 in some respects resembles a frame in which the cut film 22 is held, and the left and right sides of the frame are formed by side members 23 and 24. In its usual condition, with the dark slides 21 inserted, the lower edge of the frame is formed by a hinged flap 25 that finds its counterpart 25 on the rear of the holder, and a lock rib plate 26 completes the upper edge of the frame. A similar lock rib plate 27 is located on the rear of the holder.

Within the holder is a metal plate or septum 30 that provides the desired stiffness and rigidity for the holder, as well as holding the various elements in their proper location. The septum is probably best seen in FIGURE 4, where it will be seen that a sheet member forming the septum 30 is provided with a lower transverse member 31 and an upper transverse member 32. The lower transverse member 31 is a single member that extends across both the front and rear sides of the septum 30, extending around the lower edge of the septum and extending through apertures 33 formed in the septum. This construction is best illustrated in FIGURES 1, 2, and 5, and it will be seen that in this manner the lower transverse member 31 is securely anchored to the septum 30.

The lower transverse member 31 has a ridge 34 projecting downwardly and extending the entire length of the member. The lower surface of the ridge 34 serves as the anchor for a fabric hinge 35 that extends along the bottom, from one side of the holder 20 to the other to anchor the hinged flaps 25.

The lower transverse member 31 is also provided with longitudinally extending ridges 36 that project forwardly and rearwardly, to fit into complementary grooves 37 in the hinged flaps 25. The ridge 36 and groove 37 thus form a labyrinthine passageway that prevents light from entering the holder from the bottom even if the hinge material 35 is worn or missing.

The upper transverse member 32 is located a short distance downwardly from the upper edge of the septum 30, and like the lower transverse member 31, the upper transverse member 32 is a single member that extends across both the front and back of the septum 30. The forward and rearward sections of the upper transverse member 32 are joined by end portions 40 that extend around the sides of the septum 30, and are also joined by extending through holes 41, generally similar to the holes 33 for the lower transverse member.

As indicated in FIGURE 2, the lower edges of the upper transverse member 32 are undercut to aid in receiving and holding the sheet film 22, and the upper and lower transverse members 31 and 32 are separated a distance equal to the longer dimension of the film to be used in the holder. Thus, if the film to be used in a holder is four inches by five inches, the distance from the lower transverse member 31 to the upper transverse member 32 is slightly less than five inches, so that the upper edge of the film 22 may fit beneath the outermost edge of the upper transverse member, resting within the undercut as shown. The corresponding edge of the lower transverse member 31 is not undercut, since the lower edge of the film 22 butts against the upper edge of the lower transverse member, though a notch 42 is preferably formed in the lower transverse member 31 for easy removal of the sheet film. The lower edge of the film 22 is held flat, against the septum 30, by pads 43 extending along the length of the flaps 25 and bearing against the lower edge of the film when the flaps are in their normal position, as shown in FIGURE 1.

It will be appreciated that the use of the undercut edge on the upper transverse member 32, the use of the notch 42, and the use of the ribs 36 and cooperating grooves 37 in the lower transverse member and flaps are not new and have been used before. However, the positive anchoring of the upper and lower transverse members 31 and 32 and the anchoring of other members to the transverse members in the manner hereinafter described is new. This anchoring and interfitting of parts provides a strong and rigid construction superior to that heretofore available.

The side members 23 and 24 extend between the lower transverse member 31 and the upper transverse member 32 and lock rib plates 26. Cementing is not a practical way to secure the side members 23 and 24 to the septum 30, and while these members are formed with a fit such that they engage the septum tightly, more than frictional engagement is required. Consequently, an interlocking and interfitting construction is used.

As seen in FIGURES 3 and 4, the side member 23 is formed of two sections, an inner ribbed section 44, and an outer channel section 45. The use of two sections permits an improved design and simpler dies, and makes it possible to secure a better film holder. The inner ribbed section 44 has a generally U-shaped appearance in cross section with the legs of the U engaging the front and rear surfaces of the septum. The base of the U extends around the edge of the septum, and at the free ends of the legs 46 of the U, flanges 50 are provided that are an extension of the legs but spaced from the septum 30 to receive the side edges of sheet film 22. The flanges 50 thus cooperate with the undercut edge of the upper transverse member 32 to hold the two sides of the sheet film 22 flat, while the upper edge is held flat by the undercut section. The lower ends of the flanges 50 are above the lower ends of the ribbed members 44, and the lower ends of the flanges are undercut, as indicated at 52 in FIGURE 4, to aid in the insertion of film.

Located outwardly from the flanges 50 and extending vertically along the members 44 are ribs 53 that project from the legs of the U and form a bearing surface for the dark slide 21. The inner surface of the slide 21 bears against the rib 53 near the edge of the slide, and the side edges of the slide bear against and are guided by another rib 55 spaced from the rib 52. Considering only the forward leg 46 of the ribbed member 44, the innermost rib 53, adjacent the flange 50, projects a shorter distance forward than does the more outwardly spaced rib 55. Thus, as mentioned, while the inner surface of the dark slide 21 slides across the shorter inner rib 53, the edge of the dark slide bears against and is guided by the higher rib 55. A groove is formed between the two ribs 53 and 55, and this aids in preventing the entry of stray light into the film compartment.

Spaced from the rib 55 and at the junction of the legs 46 and base 47 are ribs 56 that may be thought of as continuations of the base 47. The ribs 56 are the same height as the ribs 55, and the ribs 56 are preferably interrupted as best seen in FIGURE 4 so that, as hereinafter described, any excess cement or solvent on the outside of the base 47 will not be trapped there but flow into the groove or recess between the ribs 55 and 56. For ease in fabrication, it may be desirable to provide apertures 57 within the groove between the ribs 55 and 56, so that the portion of the mold corresponding to the septum 30 can be held in proper alignment. However, the apertures 57 are not necessary from the standpoint of the holder itself.

To anchor the ribbed member 46 to the septum 30, the lower end of the member is provided with a downwardly extending tongue 60 that is formed as a continuation of the ribs 55 and 56 that are joined at their lower ends. The tongue 60 is spaced from the septum 30 and fits over the surface of the lower transverse member 31. The rib 36 along the lower edge of the transverse member 31 continues upwardly, along the side of the septum 30 as a rib 62, thus forming a corner pocket between the rib 36 and the rib 62. The tongue 60 is notched to receive the rib 62 and the tongue is inserted into the pocket in the general manner illustrated in FIGURE 7. The rib 62 thus prevents the lower end of the ribbed section 44 from moving outwardly, while the rib 36 prevents that member from moving downwardly. In addition, a cement or solvent is applied to the mating surfaces, and as a result the interfitted members are securely held against movement.

At its upper end, the ribbed member 44 is at least adjacent if not abutting the upper transverse member 32. To secure ease of assembly, it is not possible to interfit the upper end of the ribbed member 44 directly with the upper transverse member 32. However, it will be noted that at least a portion of the upper end of the ribbed member 44 preferably bears against the outer end of the upper transverse member 32, thus preventing upward movement of the ribbed member, just as the engagement of the lower end of the ribbed member with the lower transverse member 31 prevents downward movement of the ribbed member.

As most clearly indicated in FIGURE 4, the ribbed members 44 are covered by the channel members 45 that extend from a point adjacent the top of the ribbed members to the lower end of the holder 20. The lower end of the channel member 45 is closed by a web 64 that forms a pocket into which the outer ends of the lower transverse member 31, including the rib 62 and the ends of the ribs 36 are placed. At its upper end, the member 45 has the thickness of the walls of the channels reduced by a notch 65 formed in the inner surface, to receive a tongue as hereinafter described.

In assembling the holder, the channel member 45 is preferably held at an angle to the edge of the ribbed member 44, and the lower corner of the assembly, including the septum 30, lower transverse member 31, and ribbed member 44, is slipped into the pocket formed by the web 64 and the lower end of the channel member. The channel member 45 is then swung about the lower corner so that the upper end of the channel member is moved inwardly, as indicated generally in FIGURE 6. Once again, the holding power of the desired tight fit is augmented by the use of solvent or cement to provide a single unitary side member.

As previously mentioned, the lock rib plates 26 and 27 extend across the top of the holder, from side member 23 to side member 24. The lock rib plates 26 and 27 are given their name by reason of a rib 70 that extends across each of the plates, from one side to the other, to engage a corresponding recess in the camera back to locate and lock the holder in position during the time a picture is being taken. In their simplest form, each of the lock rib plates 26 and 27, of which the plate 26 may be considered typical, consists of a relatively flat member with the previously mentioned lock rib 70. A flange 71 is located at each end of the plate, and a similar flange 72 extends across the top of the plate. The flanges 71 and 72 of the lock rib plate 26 project toward the opposite lock rib plate 27, and the flanges of the latter plate project toward the plate 26 so that when the flanges are placed edge to edge, the plates and flanges form a thin compartment. The central portion of the flange 72 is reduced so that a wide notch is formed through which the dark slides 21 may be inserted.

Extending across the upper end of the septum 30 is a light seal consisting of a generally U-shaped strip of spring metal such as brass having a series of notches cut in its arms to form a plurality of fingers 74 extending downwardly from the upper edge of the septum 30 and away from the plane of the septum. The fingers 74 are covered by a strip of soft black cloth 75 whose lower edge they urge away from the plane of the septum and against the surface of the dark slide 21. Light seals of this general type are well known.

To hold the light seal in position along the top of the septum 30, a center top rail 76 is provided whose lower edge bears against the upper surface of the light seal just described. The middle portion of the center top rail 76 extends up through the opening formed by the notches in the flanges 72 of the lock rib plates 26, thus dividing the opening so formed into a pair of slots through each of which a dark slide 21 may pass. Locking means, such as rotatable hooks 77, are preferably mounted on the upper edge of the center top rail 76 to enable the slides 21 to be locked against accidental removal.

The lower ends of the center top rail 76 extend laterally outward beyond the ends of the opening through which the slides 21 pass, and these ends of the rail are provided with bosses 80 that project forward and rearwardly toward the lock rib plates 26 and 27.

On the interior of the lock rib plates 26 and 27 are pockets 81 adapted to receive the bosses 80 and hold them in position. Again, a close fit, supplemented with cement or solvent, produces a strong firm connection that must be broken to be separated.

At the lower edge of the lock rib plates 26 and 27 and aligned with the side members 23 and 24 are short tongues 83 adapted to fit within the recesses formed by the notches 65 in the channel members 25. It will be noted that the lock rib plates extend down, around the outside of the upper ends of the ribbed members 44, thus holding both the rib members and the lock rib plates against lateral movement with respect to the septum 30. The ribbed members 44, as will be recalled, bear firmly against the side edges of the septum 30 and cannot move closer toward each other, but can only move away from each other. By virtue of the lock rib plates engaging these ribbed members 44 and holding them against the edges of the septum, the ribbed members are held against lateral movement and so are the lock rib members. Furthermore, since the lock rib plates 26 and 27 are firmly anchored to the center top rail 76, and the latter presses the light seal combination 74 and 75 against the upper edge of the septum 30, downward movement of the lock rib plates with respect to the septum is prevented. The connection of the tongue 83 to the recess formed in the channel member 45 further aids in connecting all of the parts together to prevent movement.

To prevent a blow or similar force from forcing the lock rib plates 26 and 27 off the upper end of the septum 30, lugs 85 are formed at each end of the upper transverse member 32, and cooperating lugs 86 are formed in the interior of the lock rib plates 26 and 27. When the film holder is assembled, the lugs 86 of the lock rib plates 26 and 27 engage the lugs 85 of the upper transverse member 32 and prevent upward motion of the lock rib plates.

Thus is seen that the various elements of the structure are held against movement with respect to each other and with respect to the septum 30. By choosing a suitable plastic, especially one that is tough and not brittle, a substantially indestructible film holder is provided. Thus, the holder can be dropped on its corner and will not come apart or admit light unless the blow is of sufficient force to deform the material beyond its elastic limit. The film holder is thin, lightweight, and readily portable, and can be manufactured with a speed and precision heretofore unattainable.

While a preferred form of the invention has been disclosed, it will be realized that the invention is not to be limited to the particular form or arrangement of parts herein described and shown, except as limited by the claims.

I claim:
1. A film holder which includes:
   a septum;
   a unitary lower transverse member extending across the front and back of said septum having integral connectors between the front and back portions of said member, said connectors anchoring said member immovably to said septum;
   a unitary upper transverse member extending across the front and back of said septum having integral connectors between the front and back portions of said upper member, said connectors anchoring said upper member immovably to said septum;
   side members extending along the side of said septum between said upper and lower transverse members to define a film receiving area, the lower end of said side members interfitting with said lower transverse member to anchor said lower ends against downward and lateral movement, and each said member including a ribbed member having a slot to receive the side edge of said septum and a downwardly extending tongue to interfit with said lower transverse member, the upper end of said ribbed member substantially abutting the end of said upper transverse member, and a channel member surrounding said ribbed member and permanently connected thereto, the lower end of said channel member being closed to receive the outer end of said lower transverse member;

a light seal at the upper end of said septum;

a center top rail above said septum; and a pair of lock rib plates enclosing said center top rail and anchoring it in position, said lock rib plates interfitting with said upper transverse member and the upper ends of said side members to anchor said plates, and said upper ends of said side members against movement.

2. A film holder as defined in claim 1 in which:

said lower tranverse member has pockets formed by a bottom rib and an upwardly extending rib at each end of said member, each of said pockets being adapted to receive a portion of a ribbed member that is interfitted therein; and said lock rib plates each has pockets to receive the ends of said center top rail, and the sides of said lock rib plates each have flanges at the ends thereof to engage the ends of said upper transverse members and the upper ends of said ribbed members.

3. A film holder which includes:

a septum;

a unitary lower transverse member extending across the front and back of said septum having integral connectors between the front and back portions of said member, said connectors anchoring said member immovably to said septum;

a unitary upper transverse member extending across the front and back of said septum having integral connectors between the front and back portions of said upper member, said connectors anchoring said upper member immovably to said septum;

side members extending along the side of said septum between said upper and lower transverse members to define a film receiving area, the lower end of said side members interfitting with said lower transverse member to anchor said lower ends against downward and lateral movement, and said side member including a ribbed member having a slot to receive the side edge of said septum, the upper end of said ribbed member substantially abutting the outer end of said upper transverse member, said ribbed member having longitudinally extending ribs, the innermost of which extends a smaller distance forwardly from the body of said member than the outermost of said ribs, and a channel member surrounding said ribbed member and permanently connected thereto, by engagement with said outermost ribs of said ribbed member, said channel member stopping short of the upper end of said ribbed member, whereby said lock rib plates may engage the upper ends of said ribbed member to hold said end against outward movement;

a light seal at the upper end of said septum;

a center top rail above said septum; and a pair of lock rib plates enclosing said center top rail and anchoring it in position, said lock rib plates interfitting with said upper transverse member and the upper ends of said side members to anchor said plates, and said upper ends of said side members against movement.

4. A film holder which includes:

a septum;

a unitary lower transverse member extending across the front and back of said septum having integral connectors between the front and back portions of said member, said connectors anchoring said member immovably to said septum;

a unitary upper transverse member extending across the front and back of said septum having integral connectors between the front and back portions of said upper member, said connectors anchoring said upper member immovably to said septum;

side members extending along the side of said septum between said upper and lower transverse members to define a film receiving area, the lower end of said side members interfitting with said lower transverse member to anchor said lower ends against downward and lateral movement, and each said side member including a ribbed member having a slot to receive the side edge of said septum, the upper end of said ribbed member substantially abutting the outer end of said upper transverse member and the lower end of said ribbed member having a downwardly extending tongue to interfit with said lower transverse member, said ribbed member having longitudinally extending ribs, the innermost of which extends a smaller distance forwardly from the body of said member than the outermost of said ribs and a channel member surrounding said ribbed member and permanently connected thereto by engagement with said outermost ribs of said ribbed member, the lower end of said channel member being closed to receive the outer end of said lower transverse member, and the upper end of said channel member stopping short of the upper end of said ribbed member, whereby said lock rib plates may engage the upper ends of said ribbed members to hold said ends against outward movement;

a light seal at the upper end of said septum;

a center top rail above said septum; and a pair of lock rib plates enclosing said center top rail and anchoring it in position, said lock rib plates interfitting with said upper transverse member and the upper ends of said side members to anchor said plates, and said upper ends of said side members against movement.

5. A film holder as defined in claim 4 in which:

said lower transverse member has pockets formed by a bottom rib and an upwardly extending rib at each end of said member, each of said pockets being adapted to receive a portion of a ribbed member that is interfitted therein; and said lock rib plates each has pockets to receive the ends of said center top rail, and the sides of said lock rib plates each have flanges at the ends thereof to engage the ends of said upper transverse members and the upper ends of said ribbed members.

6. A film holder which includes:

a septum;

a unitary lower transverse member extending across the front and back of said septum having integral connectors between the front and back portions of said member, said connectors anchoring said member immovably to said septum;

said lower transverse member having pockets formed by a bottom rib and an upwardly extending rib at each end of said member, each of said pockets being adapted to receive a portion of a side member that is interfitted therein;

a unitary upper transverse member extending across the front and back of said septum having connectors between the front and back portions of said upper member, said connectors anchoring said upper member immovably to said septum;

side members extending along the side of said septum between said upper and lower transverse members to define a film receiving area, the lower end of said side members interfitting with said lower transverse member to anchor said lower ends against downward and lateral movement;

a light seal at the upper end of said septum;

a center top rail above said septum; and a pair of lock rib plates enclosing said center top rail and anchoring it in position, said lock rib plates interfitting with said upper transverse member and the upper ends of said side members to anchor said plates and said upper ends of said side members against movement;

said lock rib plates each having pockets to receive the ends of said center top rail, and the sides of said lock rib plates each having flanges at the ends thereof to engage the ends of said upper transverse members and the upper ends of said side members.

References Cited
UNITED STATES PATENTS

| | | | |
|---|---|---|---|
| 766,869 | 8/1904 | Borsum | 96—66 |
| 2,344,951 | 3/1944 | Smith | 95—66 |
| 2,506,907 | 5/1950 | Smith | 95—66 |

JOHN M. HORAN, *Primary Examiner.*